US009302767B2

(12) United States Patent
Cook et al.

(10) Patent No.: US 9,302,767 B2
(45) Date of Patent: Apr. 5, 2016

(54) NOSE LANDING GEAR ARRANGEMENT FOR AIRCRAFT AND METHOD OF ASSEMBLY

(71) Applicant: Gulfstream Aerospace Corporation, Savannah, GA (US)

(72) Inventors: Brian G. Cook, Savannah, GA (US); John Louis, Savannah, GA (US); Thomas Van de Ven, Savannah, GA (US); Robert M. Vieito, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 186 days.

(21) Appl. No.: 13/674,303

(22) Filed: Nov. 12, 2012

(65) Prior Publication Data

US 2014/0131514 A1    May 15, 2014

(51) Int. Cl.
B64C 25/00    (2006.01)
B64C 25/16    (2006.01)
B64C 25/14    (2006.01)

(52) U.S. Cl.
CPC ............... *B64C 25/001* (2013.01); *B64C 25/14* (2013.01); *B64C 25/16* (2013.01); *B64C 2025/003* (2013.01); *B64C 2025/006* (2013.01); *Y10T 29/49826* (2015.01)

(58) Field of Classification Search
CPC ...... B64C 25/16; B64C 25/50; B64C 25/001; B64C 25/14; B64C 25/15; B64C 2025/003; B64C 2025/006; B64C 2025/001; B64C 2025/0066

USPC .................................. 244/1 N, 50, 51, 100 R
See application file for complete search history.

(56) References Cited

U.S. PATENT DOCUMENTS

| 2,418,325 | A | * | 4/1947 | Wassall et al. | ................... 244/50 |
| 3,169,001 | A | * | 2/1965 | Horne | ........................ 244/103 R |
| 2006/0102775 | A1 | * | 5/2006 | Chow et al. | ................... 244/1 N |
| 2009/0321559 | A1 | | 12/2009 | Chow et al. | |
| 2010/0012778 | A1 | * | 1/2010 | Chow et al. | ................... 244/1 N |

FOREIGN PATENT DOCUMENTS

| EP | 2415670 A1 | 2/2012 |
| WO | 0104003 A1 | 1/2001 |

OTHER PUBLICATIONS

MehdiR. Khorrami, Airframe Noise Reduction Status and Plans, National Aeronautics and Space Administration, AIAA Aero Sciences Meeting, Jan. 4-7, 2011.
European Patent Office, Extended European Search Report for Patent Application No. EP 13005297.0, mailed May 22, 2014.

* cited by examiner

*Primary Examiner* — Nicholas McFall
(74) *Attorney, Agent, or Firm* — Ingrassia, Fisher & Lorenz PC

(57) ABSTRACT

A nose landing gear arrangement for an aircraft and a method of assembling the nose landing gear arrangement are disclosed herein. The nose landing gear arrangement includes, but is not limited to, a wheel assembly, a shock strut extending upwards from the wheel assembly towards a fuselage of the aircraft, and a torque arm assembly coupled to the wheel assembly and to the shock strut. The torque arm assembly is configured to transmit torque to the wheel assembly. The torque arm assembly is disposed forward of the shock strut with respect to a direction of travel of the aircraft.

19 Claims, 4 Drawing Sheets

NOSE LANDING GEAR ARRANGEMENT FOR AIRCRAFT AND METHOD OF ASSEMBLY

TECHNICAL FIELD

The technical field generally relates to aircraft and more particularly relates to a nose landing gear arrangement for an aircraft and a method of assembling a nose landing gear arrangement for an aircraft.

BACKGROUND

Noise generated by an aircraft as it approaches a runway while landing can be a nuisance to surrounding communities. The noise generated by an aircraft on approach to a runway includes primarily two components. The first component is the noise generated by the engines of the aircraft. The second component is airframe noise, a large part of which includes the noise generated by the aircraft's landing gear passage through the air.

For decades, the noise generated by an aircraft's engines had been the dominant source of noise generated by an aircraft while landing. Accordingly, noise reducing efforts have traditionally focused on reducing the magnitude of the noise generated by the aircraft's engines. These efforts have been fruitful, and as a result of these efforts, the noise generated by an aircraft's engine while landing is now no louder than the noise generated by airframe noise, including the landing gear during landing. Therefore, in order to further diminish the noise generated by an aircraft when landing, the component of the noise attributable to the landing gear must be reduced.

It has been determined that conventional nose landing gear arrangements are particularly prone to generating loud noise during approach and landing. A conventional nose landing gear arrangement includes a wheel assembly, a shock strut mounted to the wheel assembly, and a torque arm assembly that is coupled to the shock strut and to the wheel assembly. The torque arm assembly is configured to apply a torque to the wheel assembly to allow a pilot to turn the wheel assembly, and hence steer the aircraft, once the aircraft has landed.

Conventionally, the torque arm assembly has been located to the rear of the shock strut with respect to the direction of travel of the aircraft. The shock strut is generally cylindrical in configuration. Airflow passing over the shock strut during landing sheds turbulence which then immediately impacts the torque arm assembly. This arrangement of components and its consequential sequence of events are known to produce especially loud and undesirable noise as the aircraft approaches an airfield for landing.

Accordingly, it is desirable to provide a landing gear arrangement that is configured to reduce the level of noise generated during landing. In addition, it is desirable to provide a method for assembling a landing gear arrangement that is configured to reduce the noise level generated during landing. Furthermore, other desirable features and characteristics will become apparent from the subsequent summary and detailed description and the appended claims, taken in conjunction with the accompanying drawings and the foregoing technical field and background.

BRIEF SUMMARY

A nose landing gear arrangement for an aircraft and a method of design and manufacture of a nose landing gear arrangement for an aircraft is disclosed herein.

In a first, non-limiting embodiment, the nose landing gear arrangement includes, but is not limited to a wheel assembly, a shock strut extending upwards from the wheel assembly towards a fuselage of the aircraft, and a torque arm assembly coupled to the wheel assembly and to the shock strut. The torque arm assembly is configured to transmit torque to the wheel assembly. The torque arm assembly is disposed forward of the shock strut with respect to a direction of travel of the aircraft.

In another non-limiting embodiment, the nose landing gear arrangement includes, but is not limited to, a wheel assembly, a shock strut extending upwards from the wheel assembly towards a fuselage of the aircraft, and a torque arm assembly coupled to the wheel assembly and to the shock strut. The torque arm assembly is configured to transmit torque to the wheel assembly. The torque arm assembly is disposed forward of the shock strut with respect to a direction of travel of the aircraft. The torque arm assembly has a streamlined configuration oriented to face a direction of travel of the aircraft.

In a third non-limiting embodiment, the method for assembling the nose landing gear arrangement for an aircraft includes, but is not limited to assembling a shock strut to a wheel assembly. The method further includes assembling a torque arm assembly to the shock strut and the wheel assembly such that the torque arm is oriented forward of the shock strut with respect to a direction of travel of the aircraft.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

A nose landing gear arrangement and method for making the nose landing gear arrangement is disclosed herein. As with a conventional nose landing gear arrangement, the nose landing gear arrangement of the present disclosure includes a wheel assembly, a shock strut coupled to the wheel assembly, and a torque arm assembly coupled to both the shock strut and the wheel assembly. However, unlike a conventional nose landing gear arrangement, the nose landing gear arrangement of the present disclosure positions the torque arm assembly in front of the shock strut with respect to the direction of travel of the aircraft. In this arrangement, the torque arm assembly no longer encounters the wake of the shock strut as the aircraft is flown with the landing gear down. Rather, it will encounter the free stream flow and also shield the flow past the shock strut. This will greatly diminish the amount of undesirable noise generated by the torque arm assembly as it passes through the air.

In some embodiments, the torque arm assembly of the present disclosure will have a streamlined configuration. Accordingly, when passing through the air while the landing gear is down, the streamlined torque arm assembly of the present disclosure will move through the air with a reduced wind resistance as compared with a conventional torque arm assembly. This also shields the complex structures of the landing gear downstream from direct interaction with the free stream flow. This, in turn, will reduce the amount of noise generated by the nose landing gear arrangement of the present disclosure.

A greater understanding of the nose landing gear arrangement described above and of a method for making the nose landing gear arrangement may be obtained through a review of the illustrations accompanying this application together with a review of the detailed description that follows.

Figure 1:
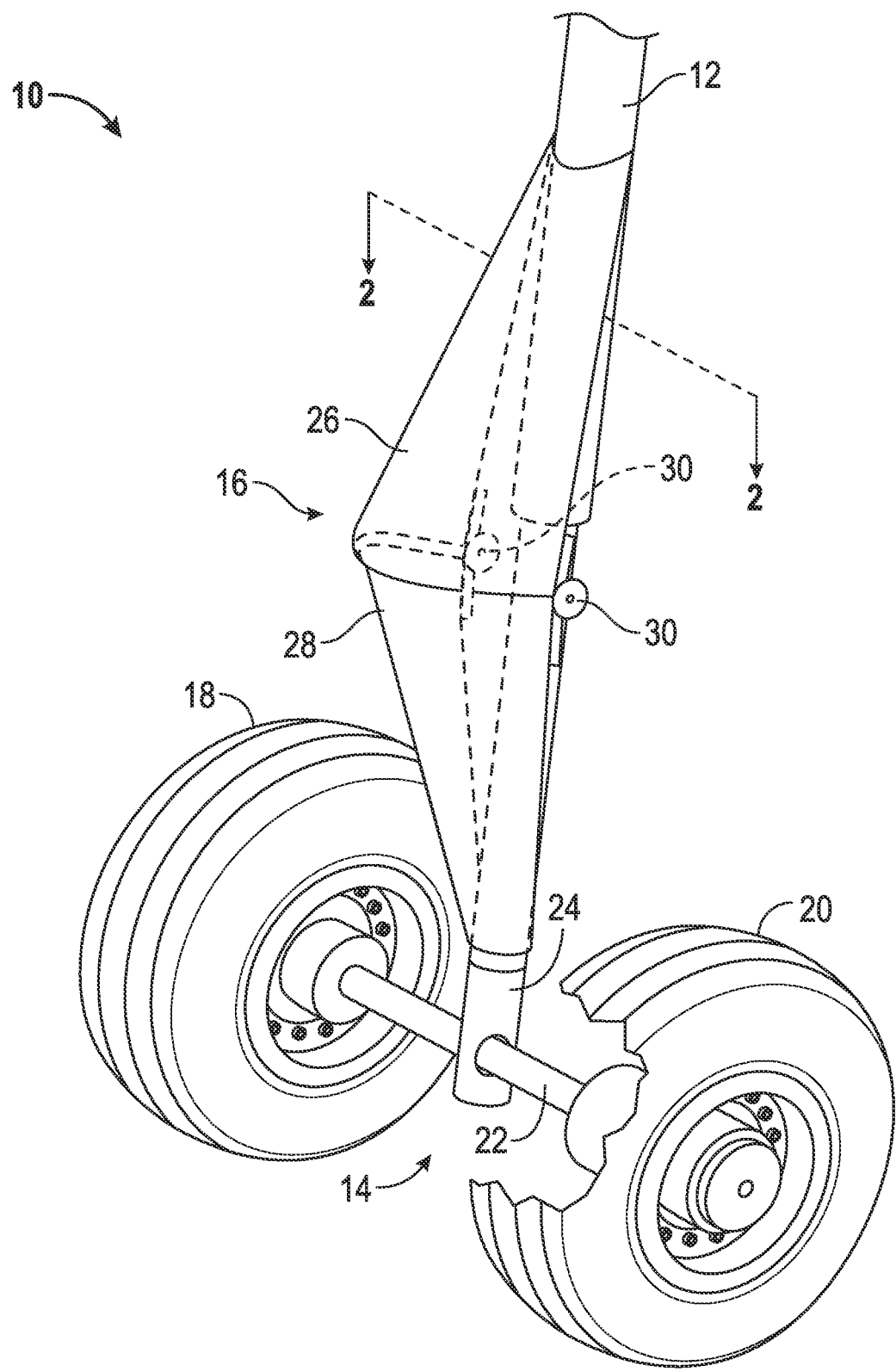
FIG. 1 is a perspective view illustrating a non-limiting embodiment of a nose landing gear arrangement made in accordance with the teachings of the present disclosure.

FIG. 1 illustrates a non-limiting embodiment of a nose landing gear arrangement 10 for an aircraft made in accordance with the teachings of the present disclosure. Nose landing gear arrangement 10 is adapted for attachment to an aircraft proximate a forward portion of the aircraft. Nose landing gear arrangement 10 is configured to support a portion of the weight of the aircraft while the aircraft is on the ground and is further configured to allow the pilot to steer the aircraft while taxiing the aircraft. Nose landing gear arrangement 10 is compatible for use with all types of aircraft including military and civilian aircraft and may also be compatible for use with other types of vehicles as well, including, but not limited to, spacecraft.

Nose landing gear arrangement 10 includes a shock strut 12, a wheel assembly 14, and a torque arm assembly 16. In other embodiments, nose landing gear arrangement 10 may include additional components not shown in FIG. 1 without departing from the present disclosure.

Shock strut 12 is configured to support a portion of the weight of the aircraft while the aircraft is on the ground. In an embodiment, shock strut 12 includes one or more springs and one or more dampers and is configured to telescopically collapse under loading upon touchdown and then partially re-expand after landing.

In the illustrated embodiment, wheel assembly 14 includes a pair of wheels (wheel 18 and wheel 20), an axle 22, and a coupling 24 for mounting wheel assembly 14 to the shock strut 12. In some embodiments, coupling 24 is configured to swivel around shock strut 12 to permit steering of the aircraft. In other embodiments, other mechanisms may be provided that permit the swiveling of the aircraft's wheels.

Torque arm assembly 16 includes an upper torque arm 26 and a lower torque arm 28. Upper torque arm 26 is coupled to shock strut 12 and lower torque arm 28 is coupled to coupling 24. In some embodiments, servos and/or motors may be attached to shock strut 12 for the purpose of delivering torque to torque arm assembly 16. In some embodiments, upper torque arm 26 may be mounted directly to such servos and/or motors. For purposes of simplification, such servos and motors have been eliminated from the accompanying figures.

Unlike conventional torque arm assemblies, torque arm assembly 16 is positioned forward of shock strut 12 with respect to the direction of aircraft travel. Further, as illustrated in FIG. 1, torque arm assembly 16 is wider than shock strut 12 along substantially its entire length. This permits torque arm assembly to act as a shield that diverts the oncoming flow of air around the shock strut 12 as the aircraft is flown with its landing gear down. This arrangement reduces the noise caused by interaction between nose landing gear arrangement 10 and the oncoming air flow when the aircraft if flown with its landing gear down by essentially reducing the number of structures that encounter the airflow.

In addition, as illustrated in FIG. 1, torque arm assembly 16 is configured to have a streamlined contour that substantially reduces the wind resistance of torque arm assembly 16 as compared with the wind resistance of conventional torque arm assemblies. Thus, not only is shock strut 12 shielded from the oncoming air flow by torque arm assembly 16, but torque arm assembly 16 also minimizes the disturbance to the oncoming airflow as the aircraft is flown with the landing gear down. This further reduces the level of noise generated by nose landing gear arrangement 10 as compared with conventional nose landing gear.

In the illustrated embodiment, upper torque arm 26 and lower torque arm 28 are coupled together by a pair of hinges 30. Hinges 30 permit upper torque arm 26 and lower torque arm 28 to pivot with respect to one another. Thus, when the aircraft lands and shock strut 12 compresses under the loading of the weight of the aircraft, torque arm assembly 16 is enabled to accommodate the changing length of shock strut 12. Although the embodiment illustrated in FIG. 1 depicts the use of a pair of hinges, it should be understood that in other embodiments, any suitable number of hinges may be used. Additionally, although hinges 30 are depicted as being located at a rear portion of torque arm assembly, in other embodiments, hinges 30 may be positioned at any suitable location on torque arm assembly 16.

Figure 2:
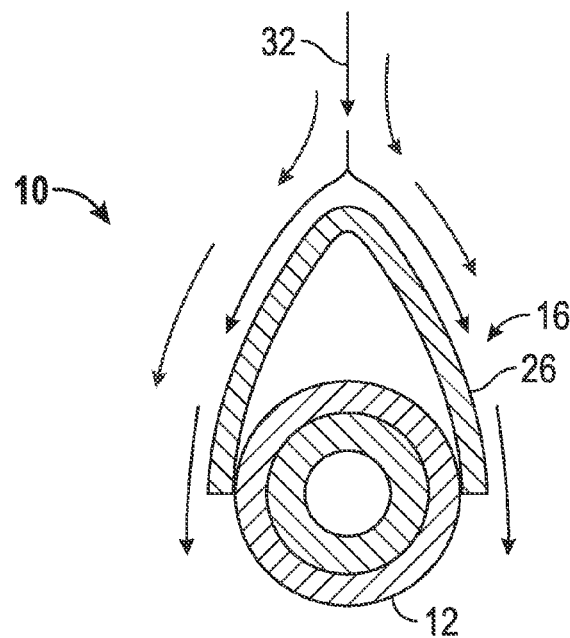
FIG. 2 is a cross sectional view taken along the line 2-2 in FIG. 1.

FIG. 2 illustrates a cross-sectional view of nose landing gear arrangement 10 taken along the line 2-2 of FIG. 1. In this view, upper torque arm 26 and shock strut 12 are depicted as an airflow 32 encounters nose landing gear arrangement 10. As illustrated, torque arm assembly 16 has a streamlined contour that is configured to offer minimal wind resistance to airflow 32. Accordingly, airflow 32 retains laminar flow as it passes along either side of torque arm assembly 16. Further, because of the relatively close positioning between shock strut 12 and upper torque arm 26, shock strut 12 is substantially shielded by upper torque arm 26 from airflow 32. As a result, airflow 32 passes tangentially along the lateral sides of shock strut 12 without having direct impingement on a front portion of shock strut 12. This shielding of shock strut 12 from airflow 32 contributes to the overall diminution of noise level generated by nose landing gear arrangement 10. While the embodiment illustrated in FIG. 2 depicts a rear portion of torque arm assembly 16 in direct contact with shock strut 12, it should be understood that in other embodiments, torque arm assembly may be spaced apart from shock strut 12. In such configuration, torque arm assembly 16 would still shield shock strut 12 from airflow 32.

Figure 3:
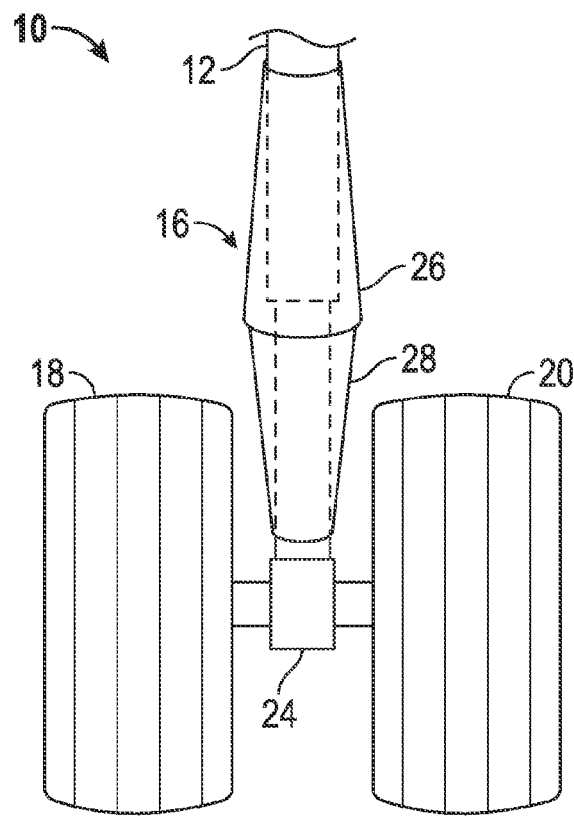
FIG. 3 is a front elevation view of the nose landing gear arrangement of FIG. 1.

FIG. 3 is a front elevation view of nose landing gear arrangement 10. Shock strut 12 is disposed behind torque arm assembly 16 with respect the aircraft's direction of travel. In this view, a portion of shock strut 12 has been depicted in phantom lines to depict the relative widths of torque arm assembly 16 and shock strut 12. In the illustrated embodiment, the torque arm assembly 16 is wider than shock strut 12 along substantially an entire length of torque arm assembly 16. Thus, torque arm assembly 16 shields shock strut 12 from oncoming air flow 32 (see FIG. 2) along substantially an entire region in which torque arm assembly 16 overlaps shock strut 12.

Also illustrated in FIG. 2 is the widening contour of upper torque arm 26 and the tapering contour of lower torque arm 28 when viewed from top to bottom. In other embodiments, different contours may be utilized. For example, torque arm assembly 16 may taper continuously from top to bottom while in other embodiments, torque arm assembly 16 may have a substantially constant width along its entire vertical length. In still other embodiments, other contours or variations may be employed without departing from the teachings of the present disclosure.

Figure 4:
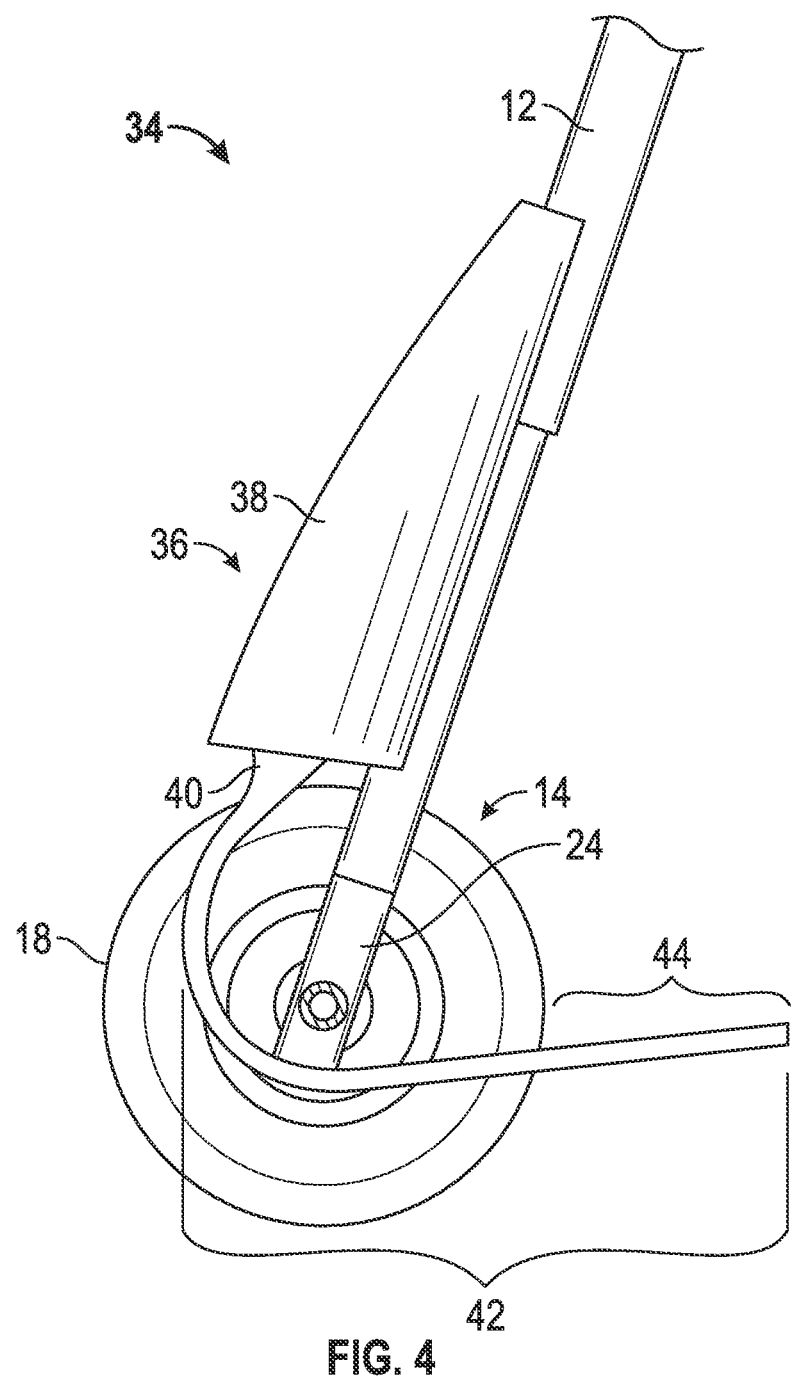
FIG. 4 is a side elevation view illustrating an alternate non-limiting embodiment of a nose landing gear arrangement made in accordance with the present disclosure.

FIG. 4 depicts an alternate embodiment of a nose landing gear arrangement (nose landing gear arrangement 34). Nose landing gear arrangement 34 includes shock strut 12 and wheel assembly 14. Nose landing gear arrangement 34 further includes a torque arm assembly 36 which includes an upper torque arm 38 and a lower torque arm 40. It should be understood that wheel assembly 14 includes two wheels, but that one of the wheels has not been illustrated in this view to facilitate the reader's ability to view torque arm assembly 36. Upper torque arm 38 and lower torque arm 40 are pivotably coupled to one another (hinges not shown) to accommodate the telescopic collapse of shock strut 12 under load.

Upper torque arm 38 is substantially similar to upper torque arm 26 (see FIGS. 1-3). It has a contour that is streamlined to present only minimal wind resistance to an oncoming air flow as the aircraft is flown with its landing gear down. Lower torque arm 40 differs from lower torque arm 28 (see FIG. 1) in that lower torque arm 40 includes a shield portion 42.

Shield portion 42 extends in a downward direction from an upper portion of lower torque arm 28 and is configured to be positioned between the two wheels of wheel assembly 14. Shield portion 42 is configured to substantially close off a gap between the two wheels of wheel assembly 14 (see, FIG. 3), and thereby prevent the funneling of the airflow through the gap when the aircraft is flown with its landing gear down. Shield portion 42 curves under wheel assembly 14 and attaches to a bottom portion of coupling 24 to allow for the delivery of torque to wheel assembly 14 to enable a pilot to steer the aircraft during taxiing. A rear portion 44 of shield portion 42 extends rearward of wheel assembly 14 and imparts a more aerodynamic configuration to shield portion 42.

Figure 5:
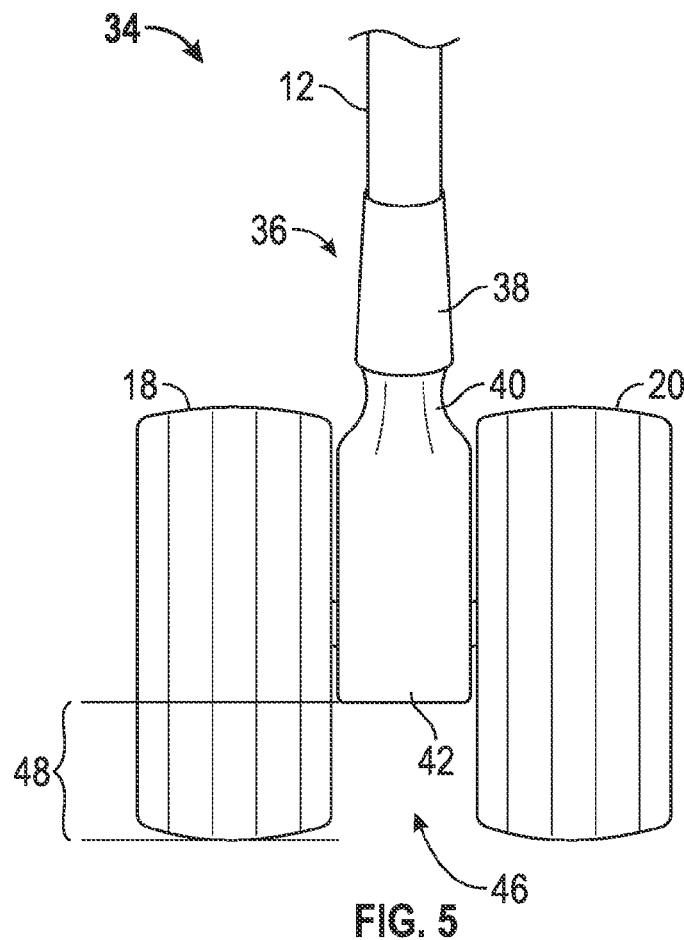
FIG. 5 is a front elevation view illustrating the nose landing gear arrangement of FIG. 4; and, FIG. 6 is a flow diagram illustrating a non-limiting embodiment of a method for assembling a nose landing gear arrangement of an aircraft.

FIG. 5 is a front elevation view of nose landing gear arrangement 34. As illustrated in this view, shield portion 42 is positioned within a gap 46 between wheel 18 and wheel 20 and further, that shield portion 42 substantially closes off gap 46, thus inhibiting the airflow from passing between wheel 18 and wheel 20. The passing of the airflow through gap 46 contributes to the overall generation of noise by the aircraft's nose landing gear. By substantially closing off gap 46, shield portion 42 inhibits the flow of air through gap 46 and diminishes the overall generation of noise by the aircraft's nose landing gear. As illustrated in FIG. 5, shield portion 42 is configured to leave a lower portion 48 of gap 46 unobstructed. This lower portion 48 of gap 46 has been left unobstructed in anticipation of wheels 18 and 20 compressing as the aircraft lands and as the weight of the aircraft loads onto shock strut 12 and to account for tire blowout. If shield portion 42 were configured to close off lower portion 48 of gap 46, then shield portion 42 might contact the runway when the aircraft lands and wheels 18 and 20 compress.

Figure 6:
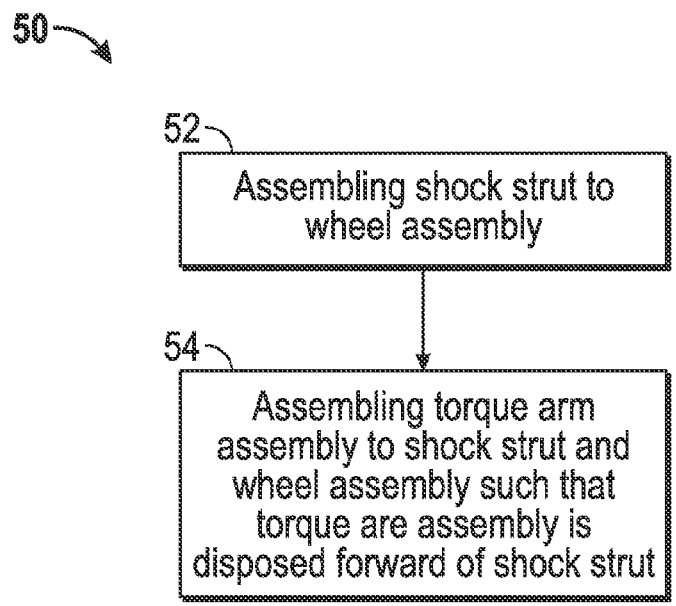

FIG. 6 is a flow diagram illustrating the steps of a method 50 for assembling a nose landing gear arrangement of the present disclosure. At step 52, a shock strut is assembled to a wheel assembly. This may be accomplished using any suitable assembly technique including the use of welds, fasteners, couplers, and the like.

At step 54, a torque arm assembly is assembled to the shock strut and to the wheel assembly. This assembly may be accomplished using any suitable assembly technique. In some embodiments, the torque arm assembly may have a streamlined configuration. In some embodiments, intervening components may be disposed between the torque arm assembly and either or both the shock strut and the wheel assembly. When assembling the torque arm assembly to the shock strut and the wheel assembly, the torque arm assembly is positioned forward of the shock strut with respect to the direction of vehicle travel.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the disclosure as set forth in the appended claims.

What is claimed is:

1. A nose landing gear arrangement for an aircraft, the nose landing gear arrangement comprising:
   a wheel assembly configured for use with the nose landing gear arrangement;
   a shock strut extending upwards from the wheel assembly towards a fuselage of the aircraft; and
   a torque arm assembly coupled to the wheel assembly and to the shock strut, the torque arm assembly configured to transmit torque to the wheel assembly, the torque arm assembly being disposed forward of the shock strut with respect to a direction of travel of the aircraft, the torque arm assembly having a width that tapers along a substantial length of the torque arm assembly, the torque arm assembly having a concave cross-section with respect to a direction opposite the direction of travel of the aircraft, and the shock strut being disposed at least partially within a recess formed by the concave cross-section.

2. The nose landing gear arrangement of claim 1, wherein the torque arm assembly comprises an upper torque arm and a lower torque arm pivotably coupled to one another.

3. The nose landing gear arrangement of claim 1, wherein the torque arm assembly is wider than the shock strut.

4. The nose landing gear arrangement of claim 3, wherein the torque arm assembly is wider than the shock strut along an entire length of the torque arm assembly.

5. A nose landing gear arrangement for an aircraft, the nose landing gear arrangement comprising:
   a wheel assembly configured for use with the nose landing gear arrangement;
   a shock strut extending upwards from the wheel assembly towards a fuselage of the aircraft; and
   a torque arm assembly coupled to the wheel assembly and to the shock strut, the torque arm assembly configured to transmit torque to the wheel assembly, the torque arm assembly being disposed forward of the shock strut with respect to a direction of travel of the aircraft, the torque arm assembly having a streamlined configuration oriented to face the direction of travel of the aircraft, the torque arm assembly having a width that tapers along a substantial length of the torque arm assembly, the torque arm assembly having a concave cross-section with respect to a direction opposite the direction of travel of the aircraft, and the shock strut being disposed at least partially within a recess formed by the concave cross-section.

6. The nose landing gear arrangement of claim 5, wherein the torque arm assembly has the streamlined configuration along an entire length of the torque arm assembly.

7. The nose landing gear arrangement of claim 5, wherein the torque arm assembly comprises an upper torque arm and a lower torque arm pivotably coupled to one another and wherein the upper torque arm and the lower torque arm each have the streamlined configuration.

8. The nose landing gear arrangement of claim 5, wherein the torque arm assembly is wider than the shock strut.

9. The nose landing gear arrangement of claim 8, wherein the torque arm assembly is wider than the shock strut along an entire length of the torque arm assembly.

10. The nose landing gear arrangement of claim 5, further comprising a shield associated with the torque arm assembly, the shield positioned and configured to substantially close off a portion of a gap between two adjacent wheels of the wheel assembly with respect to an oncoming flow of air as the wheel assembly moves in the direction of travel of the aircraft.

11. The nose landing gear arrangement of claim 10, wherein the shield extends in a downward direction from the torque arm assembly.

12. The nose landing gear arrangement of claim 10, wherein the shield is configured to permit a bottom portion of the gap to remain open.

13. The nose landing gear arrangement of claim 10, wherein the shield is integral with the torque arm assembly.

14. The nose landing gear arrangement of claim 10, wherein the shield has a curvature such that the shield curls under a portion of the wheel assembly.

15. The nose landing gear arrangement of claim 14, wherein the shield extends for a length beyond a rear portion of the wheel assembly.

16. A method of assembling a nose landing gear arrangement for an aircraft, the method comprising:

assembling a shock strut to a wheel assembly configured for use with the nose landing gear arrangement; and assembling a torque arm assembly to the shock strut and the wheel assembly such that the torque arm assembly is disposed forward of the shock strut with respect to a direction of travel of the aircraft, the torque arm assembly having a width that tapers along a substantial length of the torque arm assembly, the torque arm assembly having a concave cross-section with respect to a direction opposite the direction of travel of the aircraft, and the shock strut being disposed at least partially within a recess formed by the concave cross-section.

17. The method of claim 16, wherein providing the torque arm assembly comprises providing the torque arm assembly having a streamlined configuration, and wherein assembling the torque arm assembly to the shock strut and the wheel assembly comprises orienting the torque arm assembly such that the streamlined configuration faces an oncoming air flow as the aircraft moves in the direction of travel of the aircraft.

18. The method of claim 16, wherein providing the torque arm assembly comprises providing the torque arm assembly having an integral shield configured to extend between two adjacent wheels of the wheel assembly and to substantially close off a portion of a gap between the two adjacent wheels with respect to an oncoming flow of air as the wheel assembly moves the direction of travel of the aircraft.

19. The method of claim 18, wherein providing the torque arm assembly having the integral shield comprises providing the torque arm assembly having an integral shield having a curvature such that the integral shield curls under a portion of the wheel assembly and such that the integral shield permits a bottom portion of the gap to remain open.

* * * * *